United States Patent [19]
Weidinger

[11] Patent Number: 6,123,180
[45] Date of Patent: Sep. 26, 2000

[54] THRUST PLATE ASSEMBLY

[75] Inventor: Reinhold Weidinger, Unterspiesheim, Germany

[73] Assignee: Mannesmann Sachs AG, Schweinfurt, Germany

[21] Appl. No.: 09/335,796

[22] Filed: Jun. 18, 1999

[30] Foreign Application Priority Data

Jun. 18, 1998 [DE] Germany .......................... 198 27 055
Mar. 11, 1999 [DE] Germany .......................... 199 10 858

[51] Int. Cl.$^7$ .................................................. F16D 13/75
[52] U.S. Cl. ................................... 192/70.25; 192/111 A
[58] Field of Search ............................. 192/70.25, 111 A

[56] References Cited

U.S. PATENT DOCUMENTS

| | | | |
|---|---|---|---|
| 5,641,048 | 6/1997 | Von Gaisberg | 192/70.25 |
| 5,690,203 | 11/1997 | Link et al. | 192/70.25 |
| 5,806,647 | 9/1998 | Uehara | 192/70.25 |
| 5,975,268 | 11/1999 | Weidinger et al. | 192/70.25 |
| 5,979,628 | 11/1999 | Lampe et al. | 192/70.25 |
| 5,984,067 | 11/1999 | Weidinger et al. | 192/70.25 |

FOREIGN PATENT DOCUMENTS 196 51 633   8/1998   Germany .

*Primary Examiner*—Richard M. Lorence

*Attorney, Agent, or Firm*—Cohen, Pontani, Lieberman & Pavane

[57] ABSTRACT

A thrust plate assembly for a motor vehicle friction clutch includes a wear adjustment device arranged between the diaphragm spring and a component such as the housing or the pressure plate, and has at least one adjustment element which is displaceable and is pretensioned. At least one play sensor arrangement for detecting wear of the friction linings is clamped between the pressure plate and the flywheel. The play sensor arrangement includes a locking/detection element which is arranged on one component such as the housing or the pressure plate and which is pretensioned against the wear adjustment device with a locking portion and acts upon this wear adjustment device to prevent a movement of the at least one wear adjustment element and which interacts with another component for detection of wear. The latter component is displaceable with respect to the first component when wear occurs. The locking/detection element can be brought into a position for releasing the at least one adjustment element for movement in the wear adjusting direction when wear occurs by means of the interaction with the other component. Further, there is provided a stopping element by which the locking/detection element can be locked against movement of its pretensioning direction when the locking/detection element is brought into its position for releasing the at least one adjustment element.

26 Claims, 10 Drawing Sheets

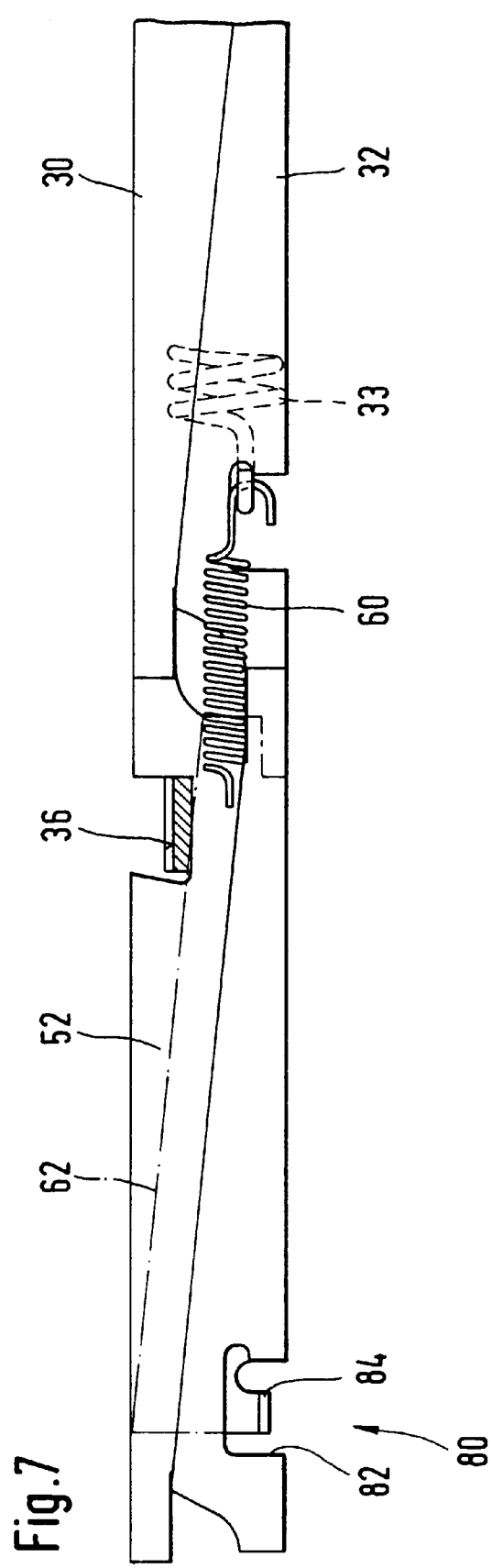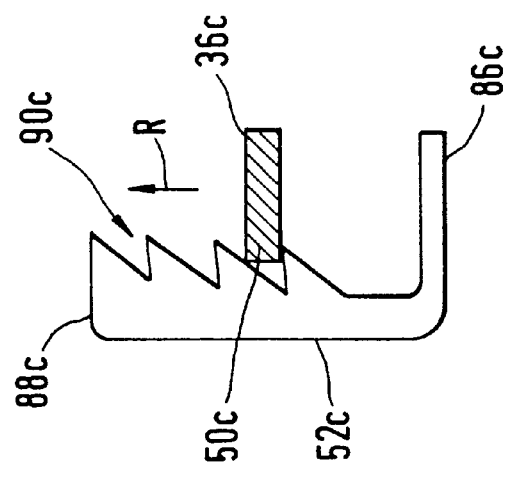

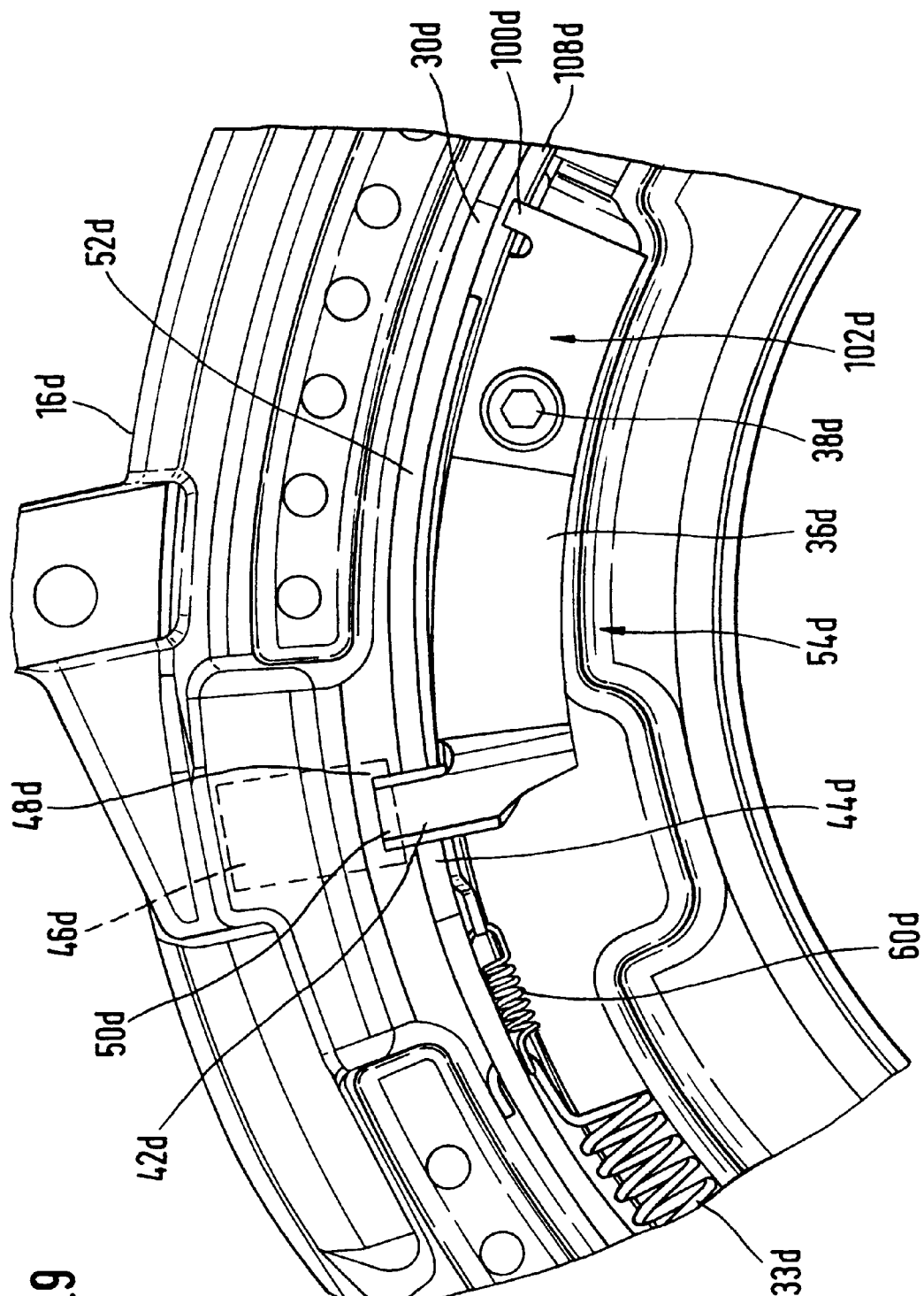

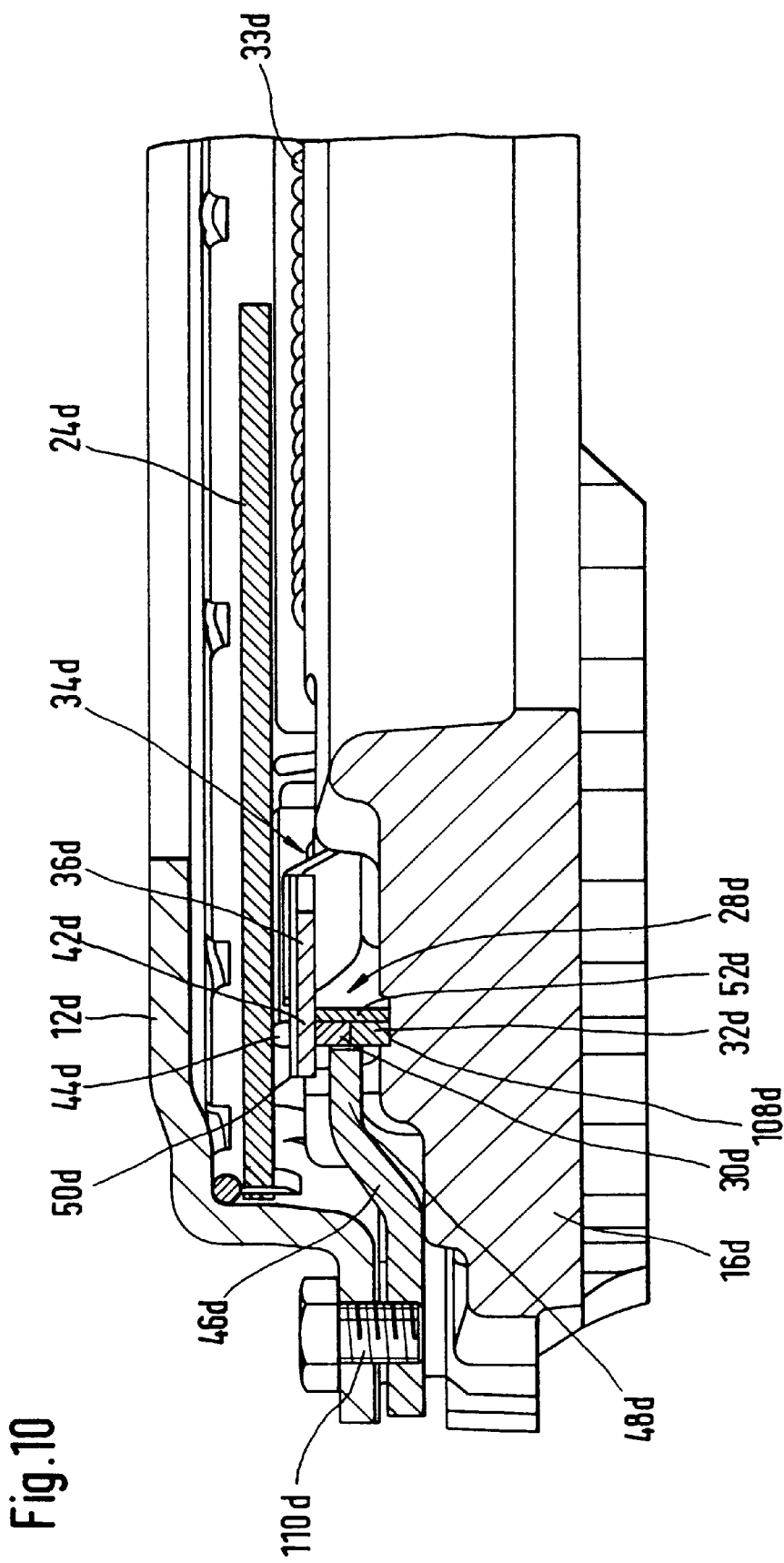

THRUST PLATE ASSEMBLY

BACKGROUND OF THE INVENTION

1. Field of the Invention

The present invention is directed to a thrust plate assembly, especially for a motor vehicle friction clutch with automatic wear compensation. Such an assembly comprises a housing which can be fixed or is fixed to a flywheel for joint rotation about an axis of rotation. A pressure plate is arranged in the housing so as to be fixed with respect to rotation relative to it and axially displaceable relative to it. An energy accumulator, preferably a diaphragm spring, is supported at the housing on one side and is supported at the pressure plate on the other side and presses the pressure plate in the direction of a side of the housing provided for connection with the flywheel. A wear adjustment device is arranged in the support path of the energy accumulator between the energy accumulator and a component of the housing and pressure plate. The wear adjustment device has at least one adjustment element which is displaceable for purposes of wear adjustment and is pretensioned in a wear adjusting direction. At least one play sensor arrangement for detecting wear in friction facings or friction linings of a clutch disk can be clamped or is clamped between the pressure plate and the flywheel. The play sensor arrangement comprises: a locking/detection element which is arranged on one component and which is pretensioned against the wear adjustment device with a locking portion and acts upon this wear adjustment device in order to prevent a movement of the at least one wear adjustment element in the wear adjusting direction and which interacts or can be made to interact by a detection portion with another component or assembly for detection of wear. The latter component or assembly is displaceable with respect to the first component when wear occurs. The locking/detection element can be brought into a position for releasing the at least one adjustment element for movement in the wear adjusting direction when wear occurs by means of the interaction with the other component or assembly.

2. Discussion of the Prior Art

A thrust plate arrangement constructed in the manner described above is known from the prior art, wherein the play sensor arrangement is constructed as follows: An axial through-opening is provided in the pressure plate and is penetrated by a pin-like detection portion of a play sensor. The pin-like detection portion is easily tiltable in the through-opening. A leaf spring element is fixedly arranged at one end of this pin-like detection portion, this end being situated at a distance from the flywheel, wherein the leaf spring element extends in the direction of the wear adjustment device so that the wear adjustment device is clamped between the pressure plate and the leaf spring element. Due to the support of the leaf spring element at the wear adjustment device, the pin-like detection portion is tilted in its through-opening due to the spring elasticity of the leaf spring element, and is accordingly pretensioned in a friction clamping fit. If wear occurs in friction linings of a clutch disk which are located between the pressure plate and flywheel, the pressure plate moves in the direction of the flywheel until the pin-like detection portion stands up at the flywheel. In so doing, this detection portion is displaced in its through-opening axially with respect to the pressure plate against the pretensioning action and friction clamping fit. This means that its end by which it is connected with the leaf spring element is pushed away from the pressure plate so that the pretensioning force by which the leaf spring element acts upon the wear adjustment device decreases. When the force of the diaphragm spring exerted on the wear adjustment device is reduced or released in a subsequent disengagement process, the at least one adjustment element can move in the wear adjusting direction accompanied by increasing tensioning of the leaf spring element until the pretensioning force by which the at least one wear adjustment element is pretensioned in the wear adjustment position and the force applied by the leaf spring element balance one another, and a further movement of the at least one wear adjustment element is blocked in the wear adjusting direction by the leaf spring. This means that in this arrangement, the play sensor formed of the pin-like detection portion and the leaf spring element is displaced to an increasing extent with respect to the pressure plate and there takes place a successive relaxing of the leaf spring element (when wear is detected) and tensioning of the leaf spring element (when wear is compensated).

In order to carry out wear compensation in an arrangement of this kind to an extent which exactly corresponds to the wear of the friction linings detected by the play sensor, the spring elasticity or spring constant of the leaf spring element must be provided in a highly precise manner. If the leaf spring element is somewhat too soft, there is a risk that overcompensation of wear can take place; if the leaf spring element is too stiff, there is a risk that the wear will not be sufficiently compensated and that the interaction of the different components cannot take place in the provided manner.

SUMMARY OF THE INVENTION

Therefore, it is an object of the present invention to provide a thrust plate assembly which is constructed in a simple manner and can automatically carry out precise wear compensation.

This object is met according to the invention by a thrust plate assembly, especially for a motor vehicle friction clutch with automatic wear compensation, comprising a housing which can be fixed or is fixed to a flywheel for joint rotation about an axis of rotation. A pressure plate is arranged in the housing so as to be fixed with respect to rotation relative to it and axially displaceable relative to it. An energy accumulator, preferably a diaphragm spring, is supported at the housing on one side and is supported at the pressure plate on the other side and presses the pressure plate in the direction of a side of the housing provided for connection with the flywheel. A wear adjustment device is arranged in the support path of the energy accumulator between the energy accumulator and a component such as the housing or the pressure plate and has at least one adjustment element which is displaceable for purposes of wear adjustment and is pretensioned in a wear adjusting direction. At least one play sensor arrangement is provided for detecting wear in friction facings or friction linings of a clutch disk which can be clamped or is clamped between the pressure plate and the flywheel. The play sensor arrangement comprises: a locking/detection element which is arranged on the one component and which is pretensioned against the wear adjustment device with a locking portion and acts upon this wear adjustment device in order to prevent a movement of the at least one wear adjustment element in the wear adjusting direction and which interacts or can be made to interact by a detection portion with another component or assembly for detection of wear, the latter component or assembly being displaceable with respect to the first component when wear occurs. The locking/detection element can be brought into a position for releasing the at least one adjustment element for movement in the wear adjusting direction when wear occurs by means of the interaction with the other component or assembly.

Also provided in the thrust plate assembly according to the invention is a stopping element by which the locking/detection element can be locked against movement in its pretensioning direction when the locking/detection element is brought into its position for releasing the at least one adjustment element.

The construction, according to the invention, of the thrust plate assembly enables operation based on the following principle: When wear occurs, the locking/detection element, through interaction of the detection portion with the other component or assembly, is initially brought into a position in which it does not act upon the wear adjustment element and the at least one adjustment element is accordingly released for movement in the wear adjusting direction. When the clutch is engaged, however, the wear adjustment device and therefore also the at least one adjustment element are initially acted upon only by the diaphragm spring and can accordingly not carry out a compensating movement. This is only possible in a subsequent disengagement process in which the wear adjustment device is released by the diaphragm spring. However, since a movement generally occurs between the one component and the other component during a disengagement process of the kind mentioned above resulting in a movement of the locking/detection element out of the above-described position, there is provided a stopping element which provides for a stopping or locking of the locking/detection element and ensures that an intermediate space produced between the wear adjustment device and the locking portion by interaction of the detection portion with the other component is filled up again in that the at least one adjustment element moves in the wear adjusting direction and not in that the locking/detection element moves back into its initial position again.

In a construction of this type it is possible to construct the locking/detection element in such a way with respect to the pretensioning force provided for it that this force is always sufficient in every operating state, i.e., in every wear state, to prevent unwanted wear compensation when acted upon by the wear adjustment device. This means that the locking/detection element can basically be pretensioned against the wear compensation device by a force which is appreciably greater than the force by which the at least one wear adjustment element is pretensioned for movement in the wear adjusting direction. This is possible because an equilibrium between these two forces need not be taken into account in that the stopping element is provided.

In the thrust plate assembly according to the invention, it is preferable that the locking/detection element is substantially fixedly arranged in one end area at the one component and is pretensioned against the at least one adjustment element by spring force.

An extremely simple and reliably acting construction can be achieved in that the locking/detection element is a spring element, preferably a leaf spring element.

In order to be able to provide a reliable operation of the stopping element, the stopping element is pretensioned in one direction for stopping the locking/detection element.

For example, the stopping element can be constructed so as to be substantially wedge-shaped and can be supported by a first wedge surface at the one component and can stop the locking/detection element by a second wedge surface.

Alternatively, it can be provided that the stopping element comprises a catch element with catch projections, preferably a saw-toothed toothing, which prevents a movement of the locking/detection element in its pretensioning direction and enables a movement opposite to the pretensioning direction.

A construction which is particularly simple to produce is achieved when the one component comprises the pressure plate. In this case, the other component is preferably the housing.

In a construction of this kind, an interaction portion with which the detection portion of the locking/detection element can make contact when wear occurs can be provided at the housing.

The number of parts can be kept small in the thrust plate assembly according to the invention when the interaction portion is formed by a surface region of the housing.

Alternatively, it is possible that an interaction element having an interaction portion is arranged at the housing.

A construction of this type is particularly preferred because it can be utilized at the same time to provide transport security. By transport security, within the meaning of the present invention, is meant protection against unintended wear compensation when transporting the thrust plate assembly according to the invention, i.e., before the latter is assembled with a flywheel or other component. For this purpose, for example, the interaction element can be arranged at the housing in a first position in which the interaction portion cannot interact with the detection portion, and in a second position in which the interaction portion can interact with the detection portion.

In another embodiment, the other component can comprise the flywheel.

In order to ensure, for example, when carrying out maintenance work or during transport before the thrust plate assembly is connected with a flywheel or the like, that an excessive displacement of the locking/detection element subsequently leads to a correspondingly large wear compensation movement, a maximum adjustment path limit arrangement for the stopping element is provided.

For this purpose, the maximum adjustment path limit arrangement comprises a locking element, preferably a locking projection at the stopping element and a counter-locking element, preferably a locking recess, at the at least one wear adjustment element.

In this type of construction of the thrust plate assembly according to the invention, the locking/detection element is arranged so as to extend substantially radially.

For example, the locking/detection element can be arranged with a radial inner area at the one component and the detection portion and/or the locking portion can be provided in a radial outer area of the locking/detection element.

In an alternative embodiment the locking/detection element is arranged so as to extend substantially in the circumferential direction. In particular when using a locking/detection element which is constructed from spring material and which must have a defined minimum length in order to enable a sufficient deformation path of the same, a configuration of this kind has the advantage that less radial installation space is taken up, so that the central opening of a pressure plate—when the pressure plate forms the one component—can be larger in order, for example, to be able to use a clutch disk with torsional vibration damper or the like.

In an embodiment of this kind, it can be provided that the locking/detection element is arranged in a first circumferential end area at the one component and, in a second circumferential end area, has the detection portion and/or the locking portion.

The locking/detection element can have a base body portion extending substantially in the circumferential direction, wherein the detection portion and/or the locking portion projects essentially radially from the base body portion in the second circumferential end area.

Further, in order to prevent the locking/detection element from rotating with respect to the component at which it is arranged, an arrangement for preventing rotation can be provided for securing the locking/detection element against rotation with respect to the one component.

The arrangement for preventing rotation can, for example, comprise a securing portion which is provided at an end area of the locking/detection element and which cooperates with a counter-securing portion at the one component.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 7 shows a view of the adjustment device of FIG. 6 from the radial outside;

FIG. 8 shows a simplified view of another embodiment of a stopping element according to the invention;

FIG. 9 shows a top view of a pressure plate with a wear adjustment device and a stopping element according to another embodiment;

FIG. 10 shows a partial longitudinal sectional view of the embodiment form shown in FIG. 9.

DETAILED DESCRIPTION OF THE PREFERRED EMBODIMENTS

Figure 1:
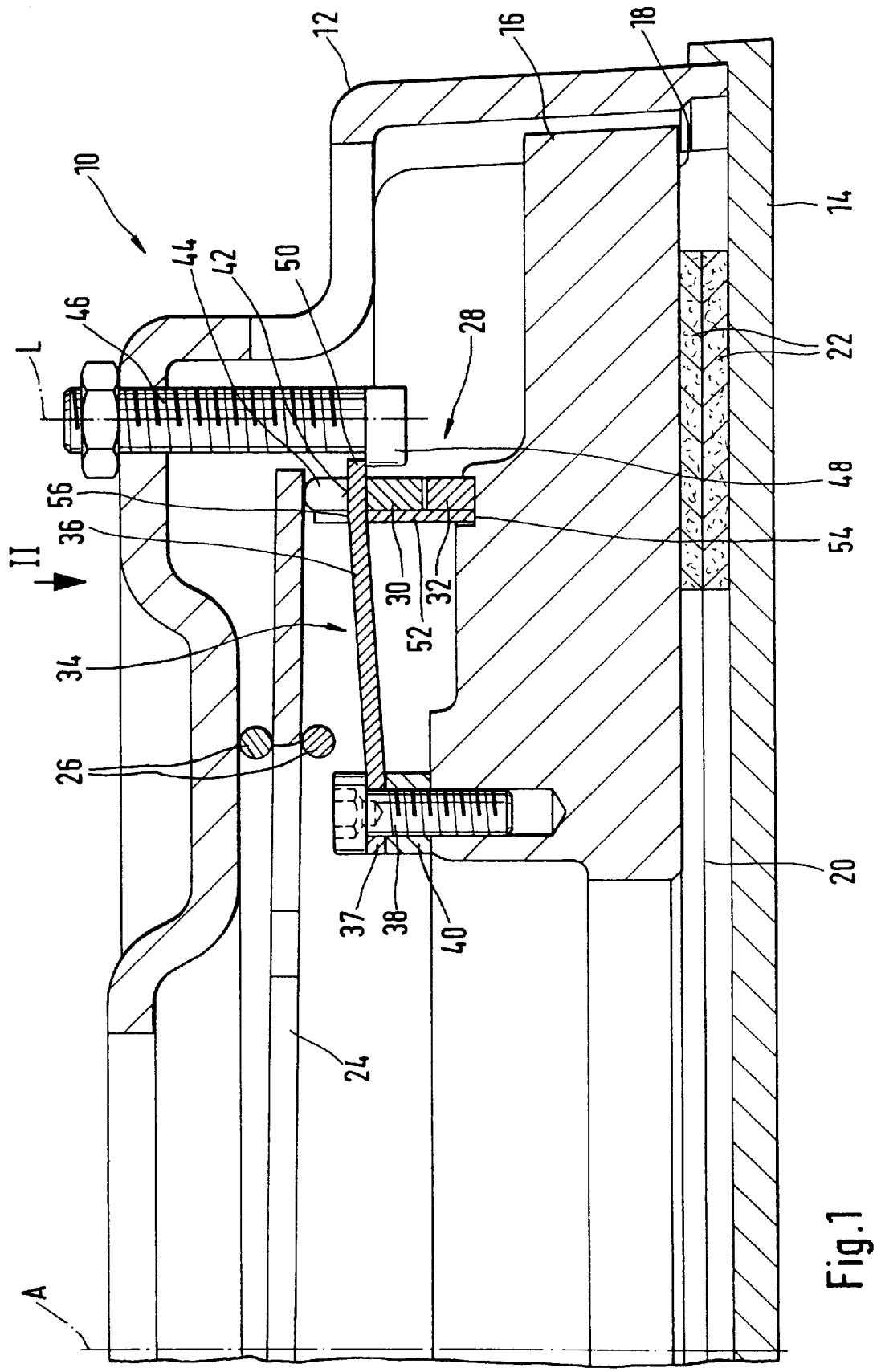
FIG. 1 shows a partial longitudinal sectional view of a thrust plate assembly according to the invention.

FIG. 1 shows a part of a thrust plate assembly 10 according to the invention in longitudinal section. The thrust plate assembly 10 comprises a housing 12 which can be assembled, in a manner known per se, with a flywheel 14, shown schematically in FIG. 1, i.e., so as to be fixed with respect to rotation relative to it, to form a motor vehicle friction clutch. The housing 12 is then rotatable together with the flywheel 14 about an axis of rotation A.

A pressure plate 16 is arranged in the housing 12. The pressure plate 16 is displaceable in the direction of the axis of rotation A but connected, by tangential leaf springs or the like, to the housing 12 so as to be fixed with respect to rotation relative to it. A clutch disk 20, shown schematically, can be clamped with its friction linings 22 in the engaged state between a friction surface 18 of the pressure plate 16 and the flywheel 14. A diaphragm spring 24 which forms the energy accumulator in the shown embodiment is supported at the housing 12 in a radial center area in a manner known per se by wire rings 26, wherein these wire rings 26 with the diaphragm spring 24 held therebetween are carried at the housing 12 by retaining pins, not shown. On the radial outside, the diaphragm spring 24 acts on a wear adjustment device 28, so that this wear adjustment device 28 is pressed between the diaphragm spring 24 and the pressure plate 16 at its side remote of the flywheel 14. In the embodiment form shown in the drawing, the wear adjustment device 28 comprises two adjusting rings 30, 32. The adjusting ring 30 is acted upon by the diaphragm spring 24 and the adjusting ring 32 lies axially between the adjusting ring 30 and the pressure plate 16. At their surface regions which contact one another, the adjusting rings 30, 32 have complementary sawtooth configurations extending in the circumferential direction, so that the adjusting rings 30, 32 are displaceable with respect to each other in the circumferential direction with sawtooth surfaces contacting one another, i.e., these sawtooth surfaces slide along one another during the relative rotation of the adjusting rings 30, 32 and, owing to this inclination, lead to an increase in the overall axial extension of the wear adjustment device 28 during relative rotation. The two adjusting rings 30, 32 are pretensioned relative to one another in a manner known per se by one or more springs 33 for this rotation in the circumferential direction.

Further, a play sensor arrangement 34 is provided at the pressure plate 16, this play sensor arrangement 34, essentially comprising a leaf spring element 36 which, is fixed to the pressure plate 16. The leaf spring element 36 is fixedly screwed to the pressure plate 16 in its radial inner end region 37 by a screw bolt 38 or the like with the intermediary of a support element 40. In particular, the connection between the leaf spring 36 and the pressure plate 16 is such that the leaf spring 36 is not rotatable, i.e., is held at the pressure plate 16 so as not to be rotatable about an axis parallel to the axis of rotation A. In a radial outer area 42 which forms a locking portion of the leaf spring element 36, the leaf spring element 36 rests on an adjusting ring 30, so that the wear adjustment device 28 is clamped in the axial direction between the leaf spring element 36 and the pressure plate 16 by the springing-elastic pretensioning force of the leaf spring element 36. The pretensioning force of the leaf spring element 36 is selected in such a way that, regardless of the state of wear which will be described hereinafter, this pretensioning force is always sufficient for preventing a relative rotation of the adjusting rings 30, 32 through the pretensioning action of the springs 33.

Figure 2:
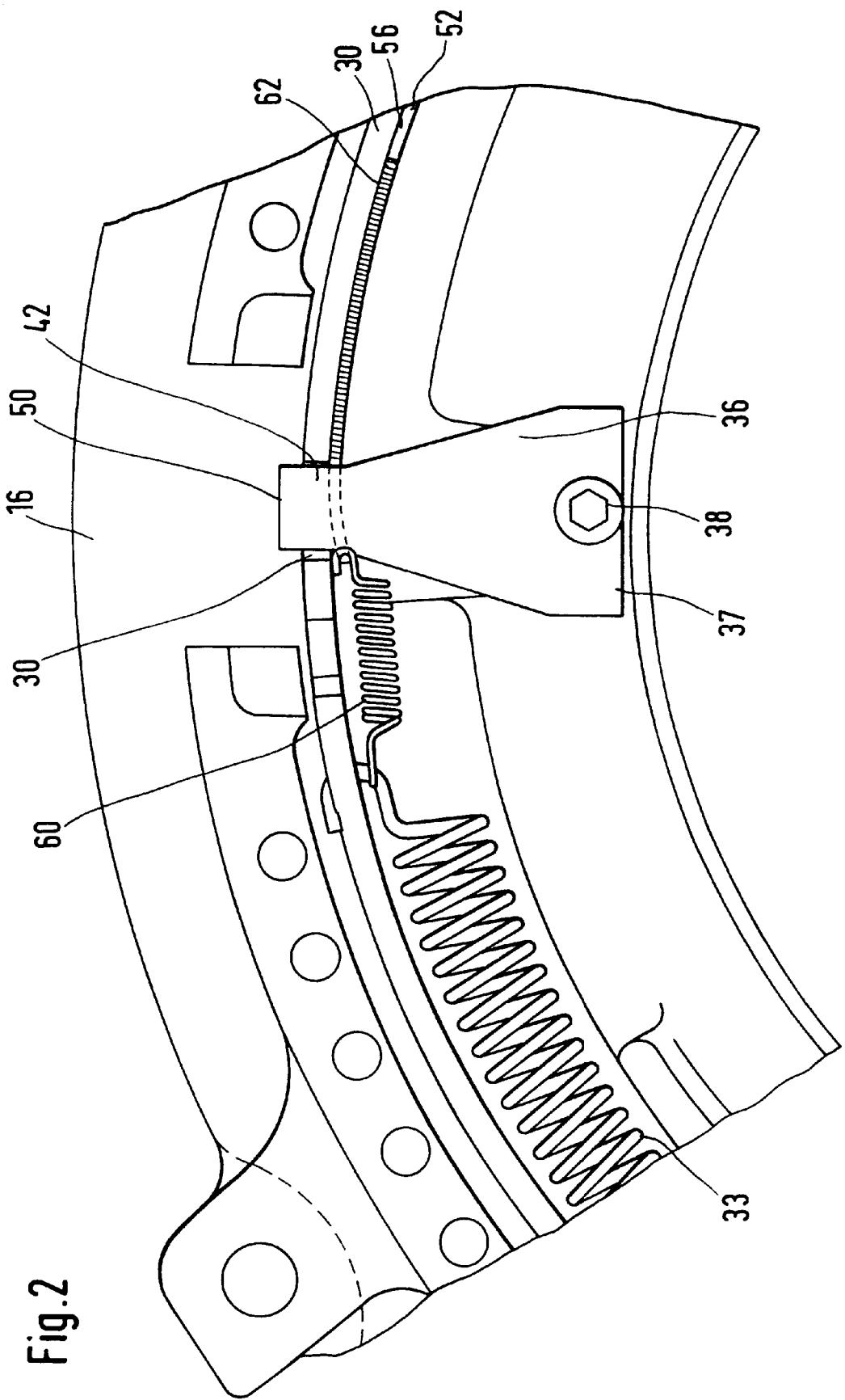
FIG. 2 shows an axial view of the thrust plate assembly of FIG. 1 in viewing direction II in FIG. 1, wherein the housing is omitted for the sake of clarity.

It will be seen from FIGS. 1 and 2 in particular that the leaf spring element 36 engages in a recess 44 of the adjusting ring 30 in the area of its locking portion 42. Therefore, the adjusting ring 30 is also locked with respect to rotation relative to the pressure plate 16 in that the leaf spring element 36 is fixed to the pressure plate 16 so as to be secured against rotation relative to it. In the case of a compensation for wear which will be described hereinafter, it is possible that only the adjusting ring 32 rotates about the axis of rotation A with respect to the pressure plate 16 and accordingly also with respect to the adjusting ring 30.

Further, an interaction pin 46 which extends in the axial direction toward the pressure plate 16 and ends in the area of the wear adjustment device 28 is arranged at the housing 12. In this end area, the interaction pin 46 is constructed so as to be eccentric with respect to its longitudinal axis L, i.e., so as not to be symmetric with respect to rotation, and has an interaction portion 48. The latter is designed to interact with a detection portion 50 of the leaf spring element 36 which extends in the radial direction beyond the wear adjustment device 28.

Figure 3:
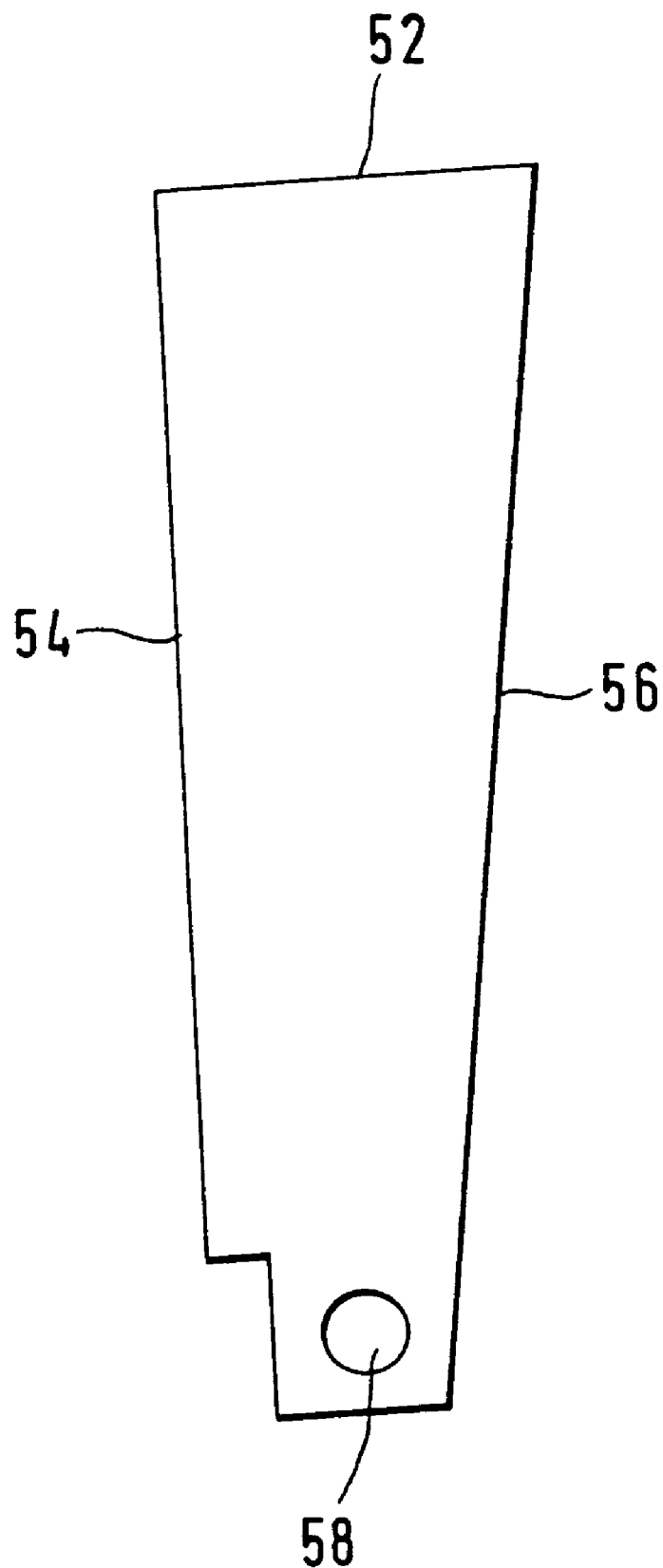
FIG. 3 is a side view of a stopping element provided in the thrust plate assembly according to the invention.

Further, a stopping element 52 which has an elongated, wedge-like configuration as can be seen from FIG. 3 is provided between the pressure plate 16 and the leaf spring element 36. The stopping element 52 has a first wedge surface 54 with which it rests on the pressure plate 16 directly radially inside the wear adjustment device 28 and extends in the circumferential direction along a portion of the adjusting rings 32, 30. The leaf spring element 36 comes to rest at a second wedge surface 56 in a manner which will be described hereinafter. The stopping element 52 is displaceable in the circumferential direction and is pretensioned by a pretensioning spring 60 which engages in an opening 58 of the stopping element 52 with one end region and is hung by its other end region at another component, for example, at that end of the spring 33 by which the spring 33 is attached to the adjusting ring 32. In the present embodiment, the spring 60 is a helical tension spring. It is noted that the spring 33 and the spring 66 can both be constructed as helical pressure springs or helical tension springs.

The thrust plate assembly 10 according to the invention operates in the manner described hereinafter when wear occurs.

In a state in which the friction linings 22 of the clutch disk 20 are not worn, the detection portion 50 either does not contact the interaction portion 48 of the interaction pin 46 or does so without pretensioning. For example, if wear of the friction linings 22 occurs during a clutch engagement process, which means that the axial extension of the same is reduced in the area between the pressure plate 16 and the flywheel 14, the entire pressure plate along with the components arranged thereon and the wear adjustment device 28 moves in the axial direction toward the flywheel 14 under pretensioning of the diaphragm spring 24. When wear is sufficiently great, the detection portion 50 comes into contact with the interaction portion 48 and the leaf spring element 36 is prevented in this end area from moving farther in the axial direction together with the pressure plate 16. When wear is extensive enough, the leaf spring element 36 is lifted from the adjusting ring 30 by its locking portion 42, so that an axial intermediate space is generated between the adjusting ring 30 and the locking portion 32. In a corresponding manner, the leaf spring element 36 would be lifted from the wedge surface 56 of the stopping element 52 if the stopping element 52 were not pretensioned by the spring 60 and displaced during this axial relative movement between the leaf spring element 36 in its radial outer area and the pressure plate 16 in the circumferential direction until this increased axial distance is filled up again by the stopping element 52. In this state, the wear adjustment device 28 is now no longer acted upon by the leaf spring element 36, but is still acted upon by the diaphragm spring 24 because of the engaged state of the clutch.

The wear adjustment device 28 can compensate for the intermediate space generated between the leaf spring element 36, i.e., the locking portion 42 of the same, and the adjusting ring 30 through rotation of the adjusting ring 32 by means of the pretensioning action of the spring 33 only during a subsequent disengagement process in which the diaphragm spring 24 is moved radially inward in the direction of the flywheel 14 in the embodiment form and, in so doing, at least partially releases the wear adjustment device 28. During this rotation of the adjusting ring 32, the adjusting rings 30, 32 slide along one another by their inclined surfaces, so that the adjusting ring 30 is displaced axially until it abuts at the leaf spring element 36 again. The wear which was previously detected by the lifting of the leaf spring element 36 from the wear adjusting device 28 is accordingly compensated for in an exact manner.

During the disengagement process, the pressure plate 16 moves away from the flywheel 14 through the pretensioning effect of the tangential leaf springs (not shown). The detection portion 50 of the leaf spring element 36 is also lifted from the interaction portion 48 of the interaction pin 46. Since the stopping element 52 has already moved beforehand into a position in which the leaf spring element 36 that is lifted from the wear adjustment device 28 is prevented from moving back into the initial position resting on the wear adjustment device 28, the occurring wear can actually be compensated by increasing the axial extension of the wear compensation means 28.

In a subsequent engagement process, the total axial extension of the unit formed of the wear adjustment device 28, pressure plate 16 and clutch disk 20 with friction linings 22 between the area where the diaphragm spring 24 rests on the adjusting ring 30 and the surface of the friction linings 22 contacts the flywheel corresponds to the state in which the friction linings 22 are not worn.

In the thrust plate assembly according to the invention, the pretensioning force which is provided by the spring elasticity of the leaf spring element 36 can be adjusted in such a way that it is greater than the pretensioning force provided by the spring 33 for the wear adjustment device 28 for every axial position of the leaf spring element 36, i.e., regardless of the actual axial extension of the wear adjustment device 28. For this purpose, it is not necessary to take into account a spring equilibrium between these two springs since a compensation of wear is carried out until the adjusting ring 30 abuts at the locking portion 42 of the leaf spring element 36 again. The arrangement is preferably carried out in such a way that the leaf spring element 36 rests against the adjusting ring 30 with substantially the same contacting force in the working area, i.e., in the range between friction linings which are not worn and the maximum wear of the friction linings. It is also possible to provide a decreasing contacting force of the leaf spring element 36.

It will be seen that when the wear compensation is carried out, both the stopping element 52 and the adjusting ring 32 move in the same direction and approximately to the same extent. However, since the spring 60 is fixed to the stopping element 52 by an end area and is fixed with respect to the adjusting ring 32 by its other end area, the spring 60 therefore remains approximately in the same installation position regardless of the wear compensation processes that are carried out, so that roughly the same pretensioning force is provided for the stopping element 52 throughout the entire operating life. Since the leaf spring element 36 contacts the wedge surface 56 and, in so doing, a shearing force acting against the pretensioning force of the spring 60 is generated on the stopping element 52, it is advantageous when the stopping element 52 is formed with a stepped portion or toothing 62 in the area of its wedge surface 56 as is shown in FIG. 2. Individual steps of a stepped portion can lie parallel to the wedge surface 54, so that a shearing force acting in the circumferential direction is not generated. When constructed as a toothing, a counter-toothing can be provided at the locking portion 42 of the leaf spring element 36, so that a positive engagement is provided between the leaf spring element 36 and the stopping element 52. In general, however, the wedge angle of the stopping element 52 is designed in such a way that there is self-locking.

The stopping element 52 can be constructed as a structural component part having a limited circumferential extension as is shown in FIG. 3. However, it is also possible to construct this stopping element 52 as a ring element which is formed in the area of the leaf spring element 36 with the respective wedge-like surfaces. It is noted that a plurality of leaf spring elements 36 of the type mentioned above can be distributed along the circumference and can then cooperate with corresponding stopping elements 52 or wedge surfaces of an annular stopping element. The leaf spring element 36 can also be replaced by a rigid element which is arranged radially inside at the pressure plate 16 so as to be swivelable about an axis of rotation lying in the circumferential direction and which is pretensioned in the direction of the ring 30 by a spring acting on the pressure plate 16 on one side and on the rigid element on the other side. When this spring is constructed as a helical tension spring extending substantially in the axial direction, then it can be ensured that the change in the spring force occurring per increase or change in swivel angle during the swiveling of the rigid element is always substantially the same.

The detection portion 50 can also be an area situated between the area of attachment of the leaf spring element 36 to the pressure plate and the locking portion 52, for example. In this case, only the interaction pin need be arranged radially inside of the wear adjustment device 28. In this case, a corresponding through-opening would have to be provided in the diaphragm spring 24.

Because of the eccentric construction of the interaction pin 46 in the area of the interaction portion 48, the latter can be rotated between two positions to achieve transport security. A first position is one in which the interaction portion 48 which can be seen in FIG. 1 does not overlap with the detection portion 50. In this position, an axial displacement of the pressure plate 16 cannot lead to the leaf spring element 36 lifting from the wear adjustment device 28. This means that in a transport state before being assembled with the flywheel 14, an unwanted "wear compensation" caused by the lifting of the leaf spring element 36 from the adjusting ring 30 cannot be produced. If the interaction pin is rotated into the position shown in FIG. 1 and fastened or fixed by a nut or the like at the housing 12, the automatic wear compensation can be carried out by the leaf spring element 36 and the other components described above.

Figure 6:
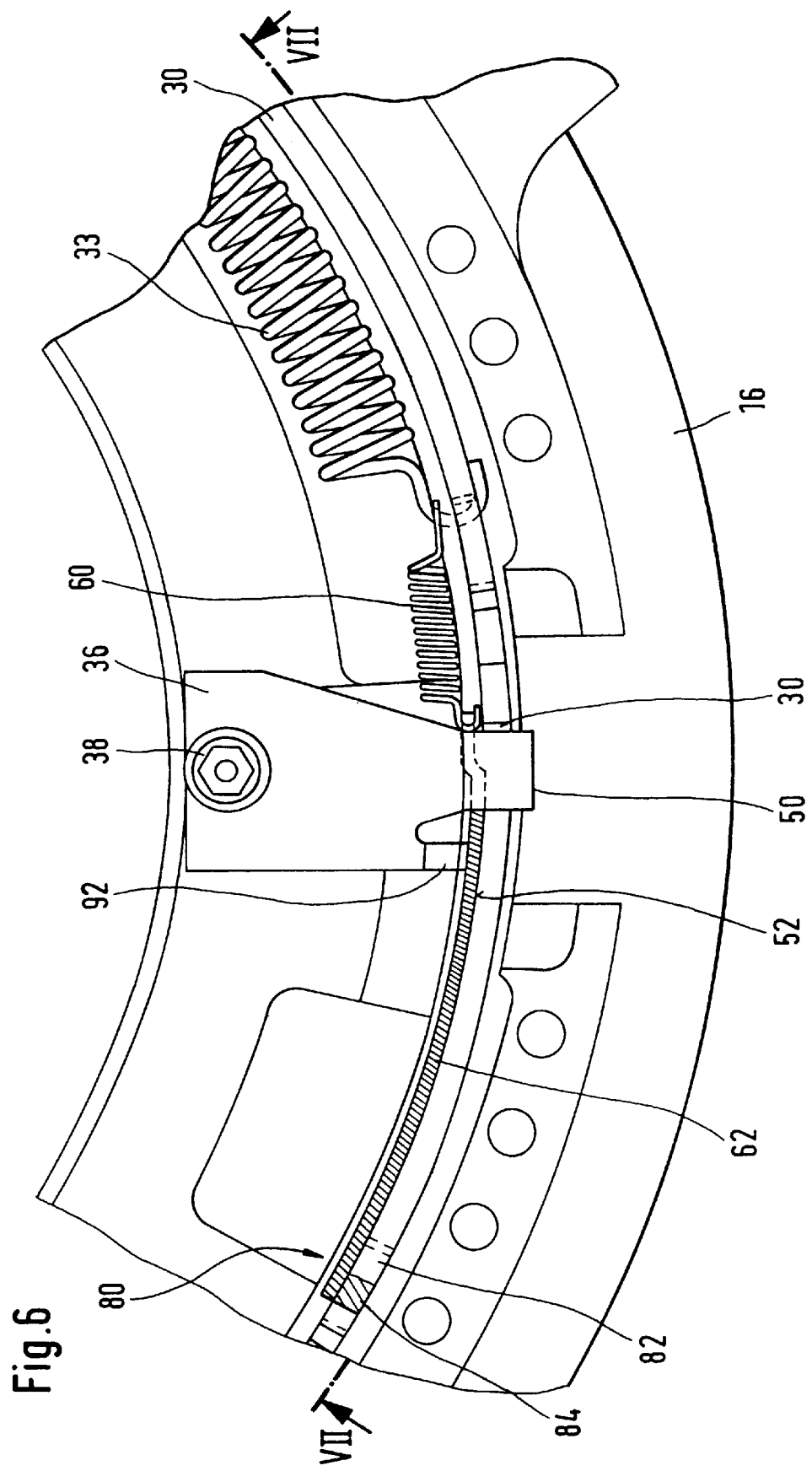
FIG. 6 shows a partial axial view of a pressure plate at which is provided an adjustment device according to another embodiment.

FIGS. 6 and 7 show a further development of the embodiment shown in FIGS. 1 to 3. In this case, components which correspond to the components described above are designated by the same reference numbers.

FIGS. 6 and 7 show a maximum adjusting path limit arrangement 80 for the stopping element 52. This arrangement 80 is formed by a circumferential recess 82 in the rotatable adjusting ring 32 and a projection 84 at the stopping element 52, which projection 84 engages in this recess 82, wherein the circumferential extension of the projection 84 is smaller than a corresponding extension of the recess 82. Accordingly, only a limited relative movement of the stopping element 52 with respect to the adjusting ring 32 is possible, wherein the extent of this relative movement is greater than the relative movements occurring in normal operation, i.e., in driving operation, between the stopping element 52 and the adjusting ring 32 when wear occurs.

However, when carrying out maintenance work or when transporting the thrust plate assembly separately from the flywheel an unwanted and excessive compensating movement is prevented in this way. That is, if the thrust plate assembly 10 is removed from the flywheel 14, for example, and no precautions are taken to prevent the leaf spring element 36 from striking the interaction portion 48, the displacing movement which occurs leads through the influence of the diaphragm spring 24 to an axially directed displacement of the pressure plate 16 opposite to the force exerted by the tangential leaf springs connecting the pressure plate 16 with the housing 12, wherein the leaf spring element 36 abuts against the interaction portion 48 at the same time and is lifted from the wear adjustment device 28. Since the wear adjustment device 28 is locked in this state against unwanted adjustment through the force exerted by the tangential leaf springs (this adjustment can occur only in driving operation, wherein the shaking movements present in the drive system induce the relative movement of the adjusting rings which is present in spite of the clamping force), the stopping element 52 forces itself into the intermediate space which is then created between the leaf spring element 36 and the pressure plate 16, but is prevented from excessive movement in that the projection 84 abuts against the circumferential edges of the recess 82. When the thrust plate assembly 10 is assembled with the flywheel 14, the leaf spring element 36 again moves toward the adjusting device 28 or the stopping element 52 and is locked against further movement corresponding to the occurring displacement of the stopping element 52 before contacting the adjusting ring 30. When the clutch is put into operation again, a wear compensation corresponding to this maximum possible adjusting movement of the stopping element 52 is carried out, wherein this wear compensation is acceptable in the framework of maintaining constant the spring characteristic of the diaphragm spring 24. However, it is important that the stopping element 52 cannot fill up the entire intermediate space produced between the leaf spring element 36 and the pressure plate 16 when carrying out maintenance work or the like, which would result in an undesirably large compensating movement to be carried out in subsequent operation. It will further be seen from FIG. 6 that a retaining portion 92 which presses against the stopping element 52 from the radial inside and accordingly holds this stopping element 52 against the inner surface of the adjusting rings 30, 32 is provided at the leaf spring element 36, i.e., at the detection portion of the play sensor. Accordingly, the stopping element 52 can be prevented from being pulled somewhat radially inward by the influence of the spring 60, especially when there is no centrifugal force being exerted.

Figure 4:
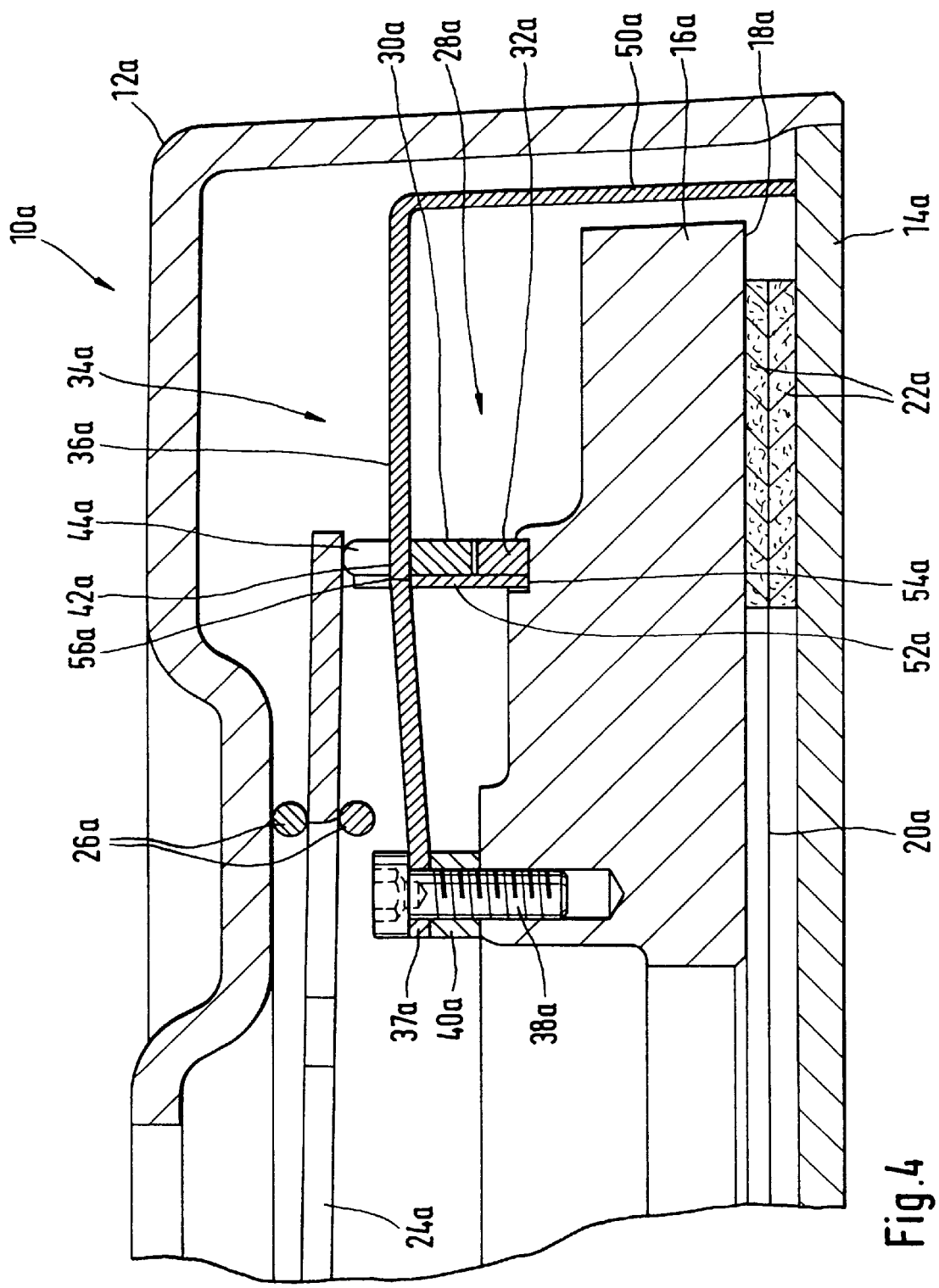
FIG. 4 shows a view corresponding to FIG. 1 of an alternative construction of thrust plate assembly.

FIG. 4 shows an alternative embodiment of the thrust plate assembly according to the invention. Components corresponding to the above-described components with respect to construction or function are designated by the same reference numbers with the addition of an "a". Essentially the differences in construction compared with the embodiment form according to FIGS. 1 to 3 will be discussed hereinafter.

It will be seen in FIG. 4 that the leaf spring element 36a is lengthened beyond its locking portion 42a over the outer circumferential edge of the pressure plate 16a and is bent in the direction of the flywheel 14a. An approximately axially extending portion forms the detection portion 50a. This detection portion 50a comes into contact with the flywheel 14a when wear occurs with a consequent reduction in the axial extension of the friction linings 22a and results in that the leaf spring element 36a in the area of its locking portion 42a cannot follow the movement of the pressure plate 16a and therefore of the wear adjustment device 28a in the direction of the flywheel 14a. When wear occurs, the locking portion 42a is lifted again from the ring element 30a and the stopping element 52a is displaced in the circumferential direction in such a way that it fills up the increased distance generated in this way between the pressure plate 16a and leaf spring element 36a in the area of the locking portion 42a. When wear occurs and when wear compensation is carried out, operation corresponds to that described above with reference to the embodiment form in FIGS. 1 to 3.

Figure 5:
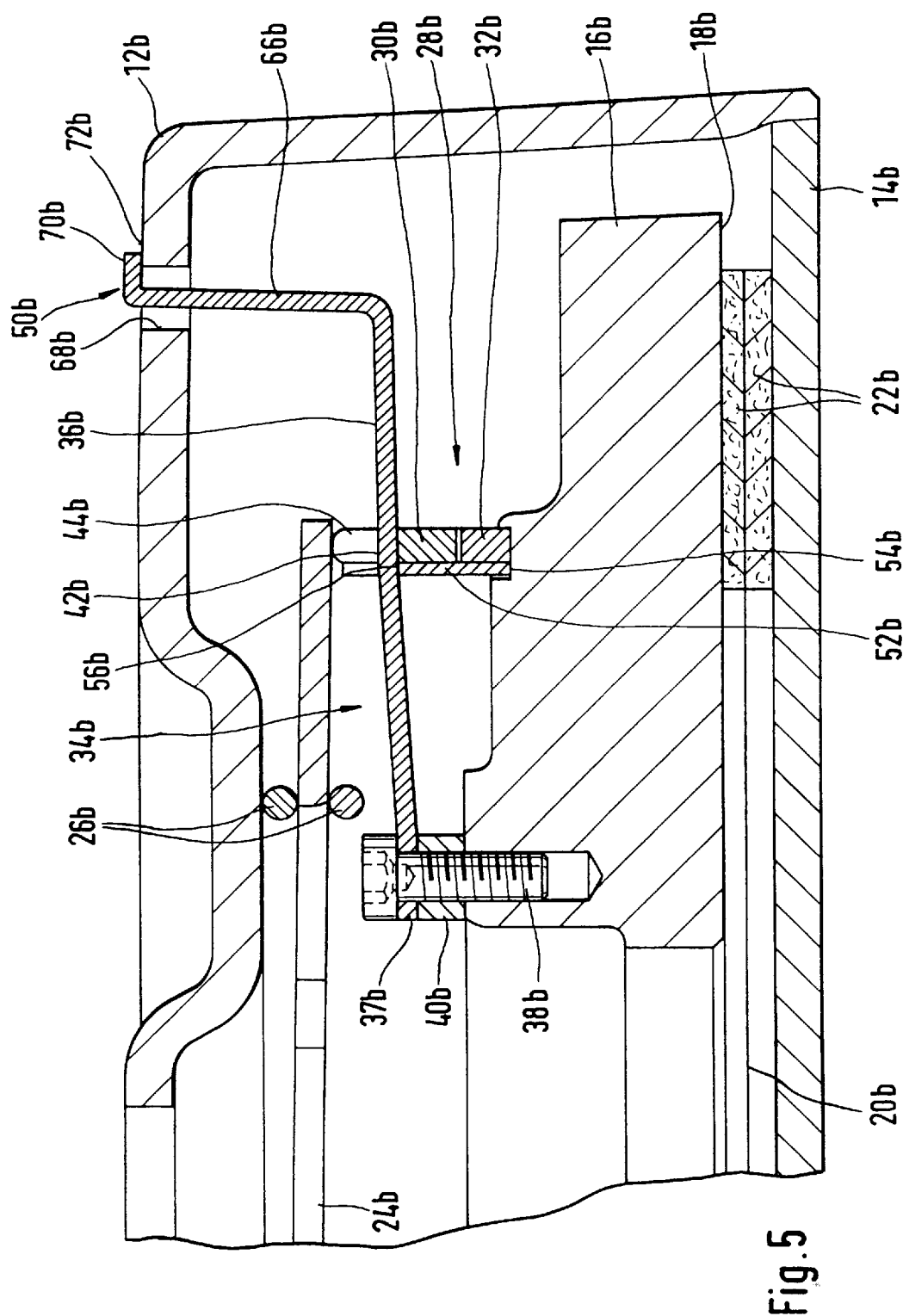
FIG. 5 shows a view corresponding to FIG. 1 of another embodiment of thrust plate assembly according to the invention.

Another alternative embodiment of the thrust plate assembly according to the invention is shown in FIG. 5. Components which correspond to the components described above with reference to FIGS. 1 to 3 are designated by the same reference numbers with the addition of "b". Again, only the differences in construction will be explored in the following.

In the embodiment shown in FIG. 5, the leaf spring element 36b is lengthened radially outward along its locking portion 42b acting on the ring element 30b and is bent away from the flywheel 14b. The leaf spring element 36b penetrates an opening 68b in the housing 12b with this roughly axially extending bent portion 66b. The leaf spring element 36b is bent again approximately in the radial direction at the outer side of the housing 12b and, with this bent portion 70b, forms the detection portion 50b. This detection portion 50b engages behind the housing 12b at the outside so that, in the surface region 72b surrounding the opening 68b, the housing 12b forms the interaction portion with which the leaf spring element 36b can come into contact by its detection portion 50b when wear occurs in the friction linings 22b. When such contact takes place and when the pressure plate 16b comes to a stop on the flywheel, the leaf spring element 36b is again lifted from the adjusting ring 30b with its detection portion 42b as was already described above. The operation for compensating for wear again corresponds to the preceding description.

In the embodiment according to FIG. 5 it is also possible that the leaf spring element 36b only extends radially outward and penetrates or engages in an opening provided in the wall portion of the housing 12 extending approximately axially.

FIG. 8 shows an alternative construction type for a stopping element 52c which can enter into a locking interaction with the leaf spring element 36c. The stopping element 52c is constructed in an angular manner with a first angle leg 86c which can be fixed, for example, at the pressure plate and a second angle leg 88c which carries a sawtooth-shaped toothing 90c at a side facing the leaf spring element 36c. The saw teeth are oriented in such a way that, when wear occurs, they enable a relative displacement of the leaf spring element 36c in the direction of arrow R in FIG. 8, but prevent a rearward movement opposite to the direction of arrow R. For example, the stopping element 52c can be constructed in a springing-elastic manner for this purpose and, when the leaf spring element 36c engaging in the toothing 90c moves in direction R, can be displaced by the inclined flanks of the teeth and spring back into the position shown in FIG. 8 after moving over a diagonal. The leaf spring element 36c can also be prevented in this way from returning to its original position once wear has occurred resulting in a corresponding deflection of the leaf spring element 36c, wherein a desired wear compensation can be carried out as a result.

Figure 11:
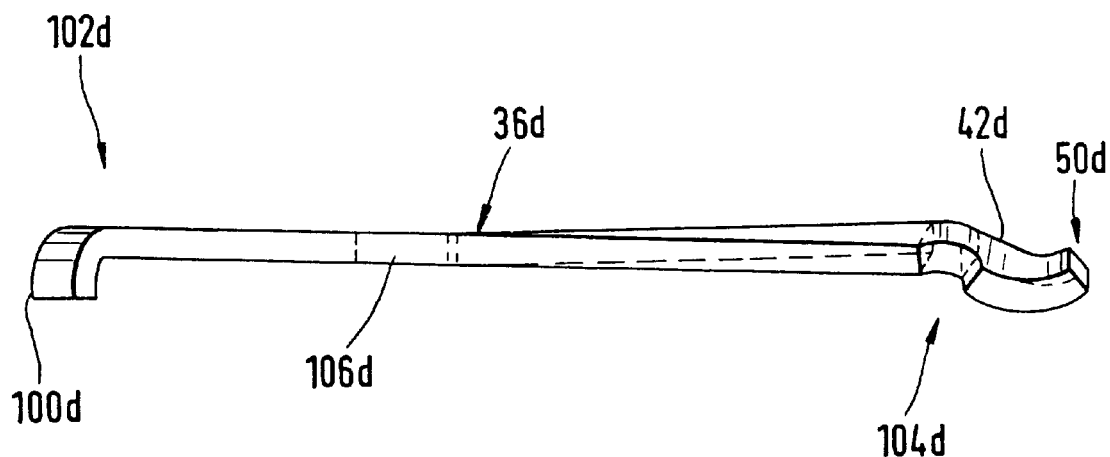
FIG. 11 shows a side view of a locking/detection element used in the embodiment according to FIGS. 9 and 10.

Another embodiment of the thrust plate assembly according to the invention is shown in FIGS. 9 to 11. An essential difference with respect to the embodiments described above is that the leaf spring element 36d which forms a locking/detection element in this case extends substantially in the circumferential direction, whereas the main direction of extension in the preceding was essentially radial. This means that the leaf spring element 36d, as is shown particularly in FIGS. 9 and 10, is screwed to the pressure plate by an end area 102d, for example, by means of a screw bolt 38d, and then extends in the circumferential direction. In its other end region 104d, starting from a base body portion 106d, a radial projection is provided which first forms the locking portion 42d which is supported on the adjusting ring 30d and then forms the detection portion 50d farther radially outside, wherein this detection portion 50d can come into contact with a counter-element 46d fixed to the housing 12d when the pressure plate 16d moves axially toward the flywheel and away from the housing in the event of wear. It will be seen that the counter-element 46d is fixed, for example, by a screw bolt 110d, to a side of a radially outwardly projecting flange-like portion of the housing 12d facing the flywheel and extends radially inward, which is also indicated by dashed lines in FIG. 9.

Through the positioning of the leaf spring element 36d at the inner side of the adjusting rings 30d, 32d and by extending in the circumferential direction, the central opening provided in the pressure plate can be made larger, so that more installation space is available for other components such as a torsional vibration damper at a clutch disk. Nevertheless, the leaf spring element 36d projects radially outward over the adjusting rings 30d with the locking portion 42d and the detection portion 50d in order to cooperate with a component on the housing side for wear detection and wear compensation. Also, in the embodiment form according to FIGS. 9 to 11, the stopping element 52d is constructed in a wedge-shaped manner, for example, and is pretensioned by the pretensioning spring 60d in a direction in which it can enter into the provided intermediate space after the lifting of the locking portion 42d from the adjusting ring 30d and can accordingly lock the leaf spring element in its end area 104d against a movement back in its pretensioning direction.

It will be seen from FIG. 10 that the leaf spring element 36d is elastically deformed axially, proceeding from its fastening at the pressure plate 16d, to generate a pretensioning force for the adjusting device 28d. In order to further increase this pretensioning force, the leaf spring element 36d has a pre-deformation or pre-shaping in the opposite direction in its relaxed state shown in FIG. 11, i.e., a curvature can be provided opposite to the intended bending direction and the leaf spring element 36d can be twisted along its longitudinal axis, so that the locking portion 42d and the detection portion 50d in particular are likewise pretensioned and predeformed in a direction opposite to the subsequently occurring deformation.

It will be seen in FIG. 9 that the leaf spring element 36d has, in end area 102d, a securing projection 100d which is produced, e.g., by bending a punched tab. This securing projection 100d engages in a circumferential groove 108d in which the adjusting ring 32d is guided on the one hand and in which the stopping element 52d is received on the other hand. Means for preventing rotation are provided for the leaf spring element 36d in this way, although only a single stopping screw 38d is used for reasons of cost and weight.

Since the stopping element is arranged directly adjacent to the wear adjustment device in all of the embodiment forms described above, it is ensured that the stopping element enters into interaction with the area of the leaf spring element in which the latter has the locking portion. This means that when wear occurs the position of the leaf spring element provided by the stopping element corresponds exactly to the position which should be occupied by the leaf spring element in the area of its locking portion for subsequent wear compensation. This also contributes to a very precise compensation of the detected wear.

The embodiments described above are those in which the wear adjustment device comprises two ring elements, one of which is pretensioned in the wear adjusting direction, i.e., for rotation in the circumferential direction. It is also possible for the wear adjustment device to comprise only one individual ring element which is pretensioned for movement in the wear adjustment direction, i.e., for rotation in the circumferential direction, and which can slide by its inclined surfaces along complementary inclined surfaces at the pressure plate and/or the diaphragm spring itself. In a corresponding manner, it is also possible to provide individual wedge elements which can be displaced by spring pretensioning either in the circumferential direction or in the radial direction and can slide along counter-wedge surfaces of either the pressure plate or the diaphragm spring or of another wedge element. When individual wedge elements are provided, it is important that a leaf spring element is associated with every wedge element or every pair of wedge elements. Further, the thrust plate assembly with the construction according to the invention can be designed for pushed clutches as well as pulled clutches. It is also possible to arrange the wear adjustment device between the diaphragm spring and the housing. In this case, the leaf spring element must also be arranged at the housing and wear can be detected, for example, in relation to the pressure plate.

The invention is not limited by the embodiments described above which are presented as examples only but can be modified in various ways within the scope of protection defined by the appended patent claims.

I claim:

1. A thrust plate assembly, comprising:
   a housing fixed to a flywheel for joint rotation about an axis of rotation;
   a pressure plate in the housing fixed with respect to rotation relative to it and axially displaceable relative to it;
   an energy accumulator having one side supported at the housing and another side supported at the pressure plate so as to press the pressure plate in a direction of a side of the housing provided for connection with the flywheel;
   a wear adjustment device arranged in a support path of the energy accumulator between the energy accumulator and one component of the housing and the pressure plate, the wear adjustment device including at least one adjustment element which is displaceable for purposes of wear compensation and is pretensioned in a wear adjusting direction;
   at least one play sensor arrangement for detecting wear in friction linings of a clutch disk which can be clamped between the pressure plate and the flywheel, the play sensor arrangement including a locking/detection element arranged on the one component and pretensioned against the wear adjustment device with a locking portion so as to act upon the wear adjustment device in order to prevent a movement of the at least one wear adjustment element in the wear adjusting direction and which is interactable via a detection portion with another component for detection of wear, the another component being displaceable with respect to the one component when wear occurs, the locking/detection element being movable into a position for releasing the at least one adjustment element for movement in the wear adjusting direction when wear occurs by interaction with the another component; and
   a stopping element arranged so as to lock the locking/detection element against movement in its pretensioning direction when the locking/detection element is brought into the position for releasing the at least one adjustment element.

2. A thrust plate assembly according to claim 1, wherein the locking/detection element has one end area substantially fixedly arranged at the one component, the locking/detection element being pretensioned against the wear adjustment device by spring force.

3. A thrust plate assembly according to claim 1, wherein the locking/detection element is a spring element.

4. A thrust plate assembly according to claim 3, wherein the locking/detection element is a leaf spring element.

5. A thrust plate assembly according to claim 1, wherein the stopping element is pretensioned in one direction for stopping the locking/detection element.

6. A thrust plate assembly according to claim 1, wherein the stopping element is substantially wedge-shaped and has a first wedge surface supported at the one component and has a second wedge surface that stops the locking/detection element.

7. A thrust plate assembly according to claim 1, wherein the stopping element comprises a catch element with catch projections so as to prevent a movement of the locking/detection element in its pretensioning direction and enable a movement opposite to the pretensioning direction.

8. A thrust plate assembly according to claim 7, wherein the catch projections are a saw-toothed toothing.

9. A thrust plate assembly according to claim 1, wherein the one component is the pressure plate.

10. A thrust plate assembly according to claim 9, wherein the another component is the housing.

11. A thrust plate assembly according to claim 10, wherein the housing has an interaction portion which is contactable with the detection portion of the locking/detection element when wear occurs.

12. A thrust plate assembly according to claim 11, wherein the interaction portion is formed by a surface region of the housing.

13. A thrust plate assembly according to claim 9, and further comprising an interaction element arranged at the housing, the interaction element having an interaction portion for interaction with the detection portion.

14. A thrust plate assembly according to claim 13, wherein the interaction element is mounted on the housing so as to be movable between a first position in which the interaction portion cannot interact with the detection portion, and a second position in which the interaction portion can interact with the detection portion.

15. A thrust plate assembly according to claim 9, wherein the another component is the flywheel.

16. A thrust plate assembly according to claim 1, and further comprising means for limiting a maximum adjustment path for the stopping element.

17. A thrust plate assembly according to claim 16, wherein the maximum adjustment path limiting means includes a locking element at the stopping element and a counter-locking element at the at least one wear adjustment element.

18. A thrust plate assembly according to claim 17, wherein the locking element is a locking projection at the stopping element and the counter-locking element is a locking recess in the wear adjustment element.

19. A thrust plate assembly according to claim 1, wherein the locking/detection element is arranged so as to extend substantially radially.

20. A thrust plate assembly according to claim 19, wherein the locking/detection element has a radial inner area arranged at the one component and a radial outer area in which at least one of the detection portion and the locking portion is provided.

21. A thrust plate assembly according to claim 1, wherein the locking-detection element is arranged so as to extend substantially in a circumferential direction.

22. A thrust plate assembly according to claim 21, wherein the locking/detection element has in a first circumferential end area arranged at the one component and a second circumferential end area provided with at least one of the detection portion and the locking portion.

23. A thrust plate assembly according to claim 22, wherein the locking/detection element has a base body portion that extends substantially in the circumferential direction, the at least one of the detection portion and the locking portion being arranged to project essentially radially from the base body portion in the second circumferential end area.

24. A thrust plate assembly according to claim 1, and further comprising means for preventing rotation of the locking/detection element with respect to the one component.

25. A thrust plate assembly according to claim 24, wherein the means for preventing rotation comprises a securing portion which is provided at an end area of the locking/detection element so as to cooperate with a counter-securing portion at the one component.

26. A thrust plate assembly according to claim 1, wherein the energy accumulator is a diaphragm spring.

* * * * *